(12) United States Patent
Murata et al.

(10) Patent No.: US 7,407,559 B2
(45) Date of Patent: Aug. 5, 2008

(54) METHOD OF PRODUCING LIQUID CRYSTAL DISPLAY DEVICES

(75) Inventors: Satoshi Murata, Kawasaki (JP);
Masahiro Miyoshi, Kawasaki (JP);
Takeshi Umegaki, Sanda (JP)

(73) Assignee: Sharp Kabushiki Kaisha, Osaka (JP)

( * ) Notice: Subject to any disclaimer, the term of this patent is extended or adjusted under 35 U.S.C. 154(b) by 418 days.

(21) Appl. No.: 10/800,124

(22) Filed: Mar. 12, 2004

(65) Prior Publication Data
US 2004/0226652 A1 Nov. 18, 2004

(51) Int. Cl.
*B32B 37/10* (2006.01)

(52) U.S. Cl. .................. 156/285; 156/286; 156/292; 156/382; 361/234

(58) Field of Classification Search .......... 156/145, 156/285–286, 292, 382; 349/92, 187; 445/24–25, 445/67
See application file for complete search history.

(56) References Cited

U.S. PATENT DOCUMENTS

| | | | | |
|---|---|---|---|---|
| 5,997,962 | A * | 12/1999 | Ogasawara et al. | 427/535 |
| 6,991,699 | B2 * | 1/2006 | Lee et al. | 156/285 |
| 2001/0021000 | A1 | 9/2001 | Egami | |
| 2002/0062787 | A1 | 5/2002 | Hashizume et al. | |
| 2003/0179340 | A1 * | 9/2003 | Park et al. | 349/156 |
| 2006/0027318 | A1 | 2/2006 | Hashizume et al. | |

FOREIGN PATENT DOCUMENTS

| | | |
|---|---|---|
| JP | 6-3632 | 1/1994 |
| JP | 8-169971 | 7/1996 |
| JP | 8-190099 | 7/1996 |
| JP | 11-326857 | 11/1999 |
| JP | 2000-66163 | 3/2000 |
| JP | 2000-208594 | 7/2000 |
| JP | 2000-349140 | 12/2000 |
| JP | 2001-215459 | 8/2001 |
| JP | 2002-229044 A | 8/2002 |
| JP | 2003-45949 * | 2/2003 |

OTHER PUBLICATIONS

On-line translation of JP 2003-45949 to Fuwa et al.*
On-line translation of JP 11326857 to Takabayashi et al, Feb. 2003.*

* cited by examiner

*Primary Examiner*—Jessica Ward
(74) *Attorney, Agent, or Firm*—Greer, Burns & Crain, Ltd.

(57) ABSTRACT

A method of producing a liquid crystal display device. A first substrate having a liquid crystal dripped thereon, and a second substrate, are arranged in a vacuum chamber. The first substrate is held by a first electrostatic chuck and the second substrate is held by a second electrostatic chuck. The second substrate is urged onto the first substrate to bond the first substrate and the second substrate together. The bonded first and second substrates are then peeled off from the electrostatic chucks. A resin sheet is arranged on the second electrostatic chuck, so that the bonded first and second substrates do not cling to the second electrostatic chuck when peeled off.

13 Claims, 5 Drawing Sheets

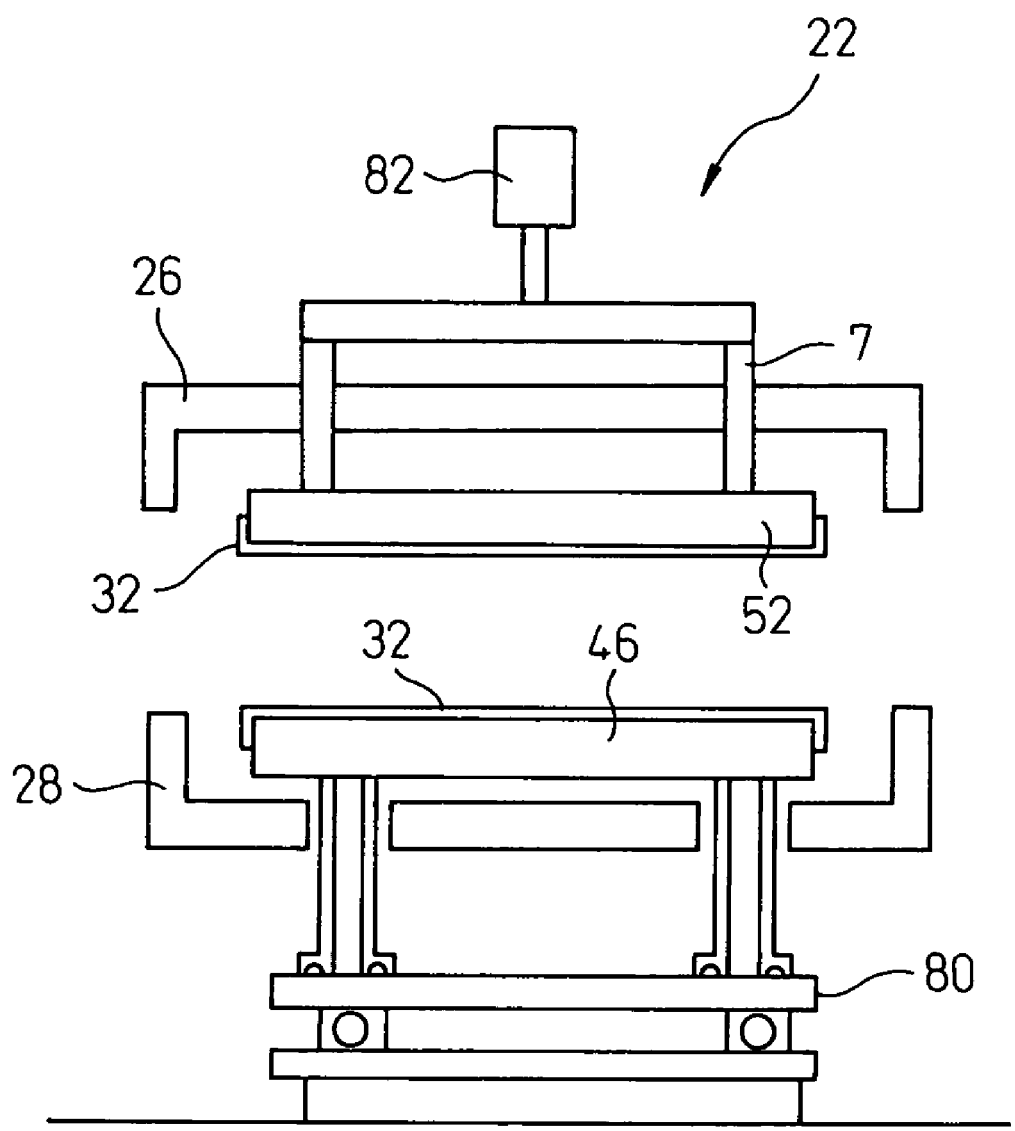

METHOD OF PRODUCING LIQUID CRYSTAL DISPLAY DEVICES

BACKGROUND OF THE INVENTION

1. Field of the Invention

The present invention relates to a method of producing a liquid crystal display device.

2. Description of the Related Art

A liquid crystal display device comprises a first substrate, a second substrate, and a liquid crystal inserted between these substrates. Here, either the first substrate or the second substrate is a TFT substrate comprising TFTs, and the other one is a color filter substrate comprising color filters. An annular seal comprising a photo-curable sealing agent is formed on the first substrate. After the first substrate and the second substrate are bonded together, the annular seal is irradiated with ultraviolet rays to be cured. The liquid crystal is inserted in a region surrounded by the annular seal.

According to a conventional method of producing a liquid crystal display device, an injection hole is formed in the annular seal, and the liquid crystal is injected through the injection hole formed in the annular seal in a vacuum chamber after the first substrate and the second substrate are bonded together. Thereafter, the injection hole in the annular seal is closed, and the annular seal is pressed so as to form a suitable cell gap.

In recent years, there has been proposed a method of producing a liquid crystal display device called a drip injection method (see, for example, Japanese Unexamined Patent Publications (Kokai) No. 8-190099, No. 2000-66163 and No. 11-326857). In the drip injection method, an annular seal is formed on one substrate, and a liquid crystal is dripped in a region inside the annular seal of one substrate. Then, the pair of substrates are bonded together under pressure in a vacuum chamber. Thereafter, the pressure of the substrates is released, the vacuum chamber is opened to the atmosphere, and the annular seal is cured by the irradiation with ultraviolet rays or by a combination of irradiation with ultraviolet rays and heating. The drip injection method makes it possible to reduce the number of steps of production and to lower the cost of producing the liquid crystal display devices.

There has further been proposed the provision of a buffer member in order to improve the non-uniformity of a cell gap caused by the introduction of foreign matter at the time when the pair of substrates are bonded together (see, for example, Japanese Unexamined Patent Publications (Kokai) No. 6-3632).

There has further been proposed an art of attracting and holding the substrates (see, for example, Japanese Unexamined Patent Publications (Kokai) No. 8-169971). In this case, a porous resin sheet is adhered onto a base plate having a ventilation hole, and the substrate is secured to the base plate by vacuum attraction via the porous resin sheet.

In the production of the liquid crystal display device by the drip injection method, electrostatic chucks are used for holding the substrates at the time of bonding the pair of substrates together. However, if foreign matter is introduced to the electrostatic chucks, the foreign matter bites into the substrate causing the cell gap to become defective. After the pair of substrates are bonded together, further, the vacuum chamber is opened to the atmosphere, and the bonded pair of substrates is taken from the electrostatic chucks. At this moment, it often happens that the pair of substrates bonded together is not reliably peeled off from the electrostatic chucks and it is forcibly peeled off, with the result that bonding deviation may occur. This phenomenon happens more conspicuously as the size of the substrates increases.

SUMMARY OF THE INVENTION

It is, therefore, an object of the present invention is to provide a method of producing a liquid crystal display device by which occurrence of defective cell gaps and bonding deviation can be avoided.

A method of producing a liquid crystal display device according to the present invention comprises dripping a liquid crystal in a region in an annular seal formed on a first substrate, preparing a second substrate, arranging a resin sheet on a surface of at least one of a first electrostatic chuck and a second electrostatic chuck arranged in a vacuum chamber, holding one of the first substrate and the second substrate by one of the electrostatic chucks via the resin sheet, holding the other substrate by the other electrostatic chuck, evacuating the vacuum chamber, bonding the first substrate and the second substrate together in the vacuum chamber, and opening the vacuum chamber to the atmosphere.

According to this constitution, a resin sheet, which is a dielectric material, is arranged between the electrostatic chuck and the substrate and the pair of substrates are bonded together. Even if foreign matter is introduced to the electrostatic chuck, the foreign matter is buffered by the resin sheet and a defective cell gap does not occur. Further, the pair of substrates are bonded together without providing any physical adhesion or sticking between the substrate and the resin sheet. When the bonded substrates are to be taken out from the electrostatic chucks, the resin sheet permits the substrate to be easily peeled off from the electrostatic chuck and decreases the bonding deviation.

BRIEF DESCRIPTION OF THE DRAWINGS

The present invention will become more apparent from the following description of the preferred embodiments, with reference to the accompanying drawings in which:

FIG. 9 is a view illustrating another embodiment of the present invention.

DESCRIPTION OF THE PREFERRED EMBODIMENTS

Embodiments of the invention will now be described with reference to the drawings.

Figure 1:
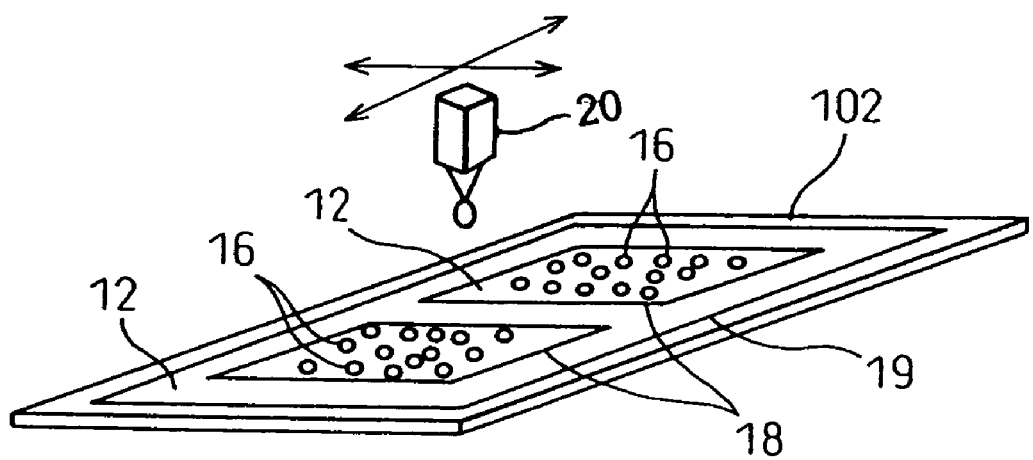
FIG. 1 is a perspective view of one of substrates of a liquid crystal display device according to an embodiment of the present invention.
Figure 2:
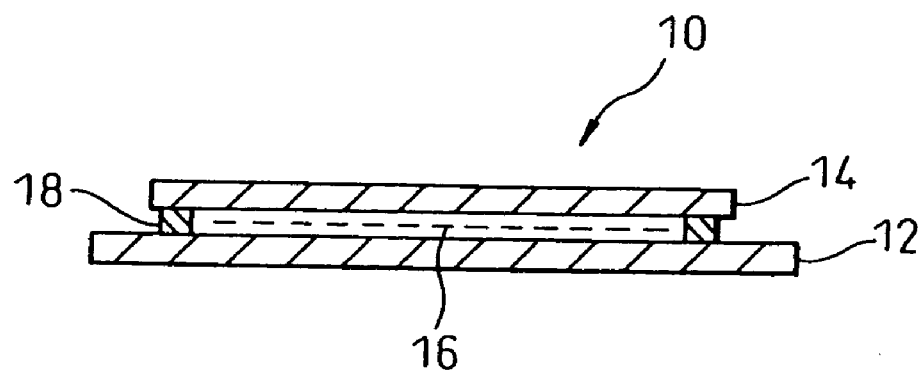
FIG. 2 is a sectional view of the liquid crystal display device including the substrate of FIG. 1.

FIG. 1 is a perspective view of one of the substrates of a liquid crystal display device according to an embodiment, and FIG. 2 is a sectional view of the liquid crystal display device including the substrate of FIG. 1.

In FIG. 2, the liquid crystal display device 10 includes first and second substrates 12 and 14, a liquid crystal 16 inserted between the first and second substrates 12 and 14, and an annular seal 18 provided between the first and second substrates 12 and 14 so as to surround the liquid crystal 16. The liquid crystal display device 10 is of an active matrix type in which one substrate is a TFT substrate comprising TFTs and the other substrate is a color filter substrate comprising color filters. The liquid crystal display device 10 is produced by a drip injection method.

FIG. 1 illustrates the first substrates 12 in FIG. 2. The first substrate 12 is processed in the state of a mother glass 102 in which a plurality of substrates are incorporated and which is separated into the individual first substrates 12 after bonding. The first substrate 12 includes the annular seal 18, and a peripheral seal 19 is provided around the two first substrates 12. This holds also for the second substrate 14. The peripheral seal 19 works to improve the stability with respect to bonding deviation by maintaining a vacuum region at the time of bonding, as will be described later.

The liquid crystal 16 is dripped in the form of droplets from a dispenser 20 onto the first substrate 12. The dispenser 20 drops the liquid crystal 16 onto a region surrounded by the annular seal 18 while moving as indicated, by the arrows, in FIG. 1. The liquid crystal droplets 16 then spread over the first substrate 12. The sealing agent forming the annular seal 18 comprises a UV-curable adhesive resin or an adhesive resin that is curable based on the combination of UV and heat. The sealing agent is applied on the first substrate 12 and is then cured. Adhesive spacers obtained by coating spacers with an adhesive are applied to the second substrate 14. The step of applying the spacers can be omitted by providing poles instead of the spacers.

Figure 3:
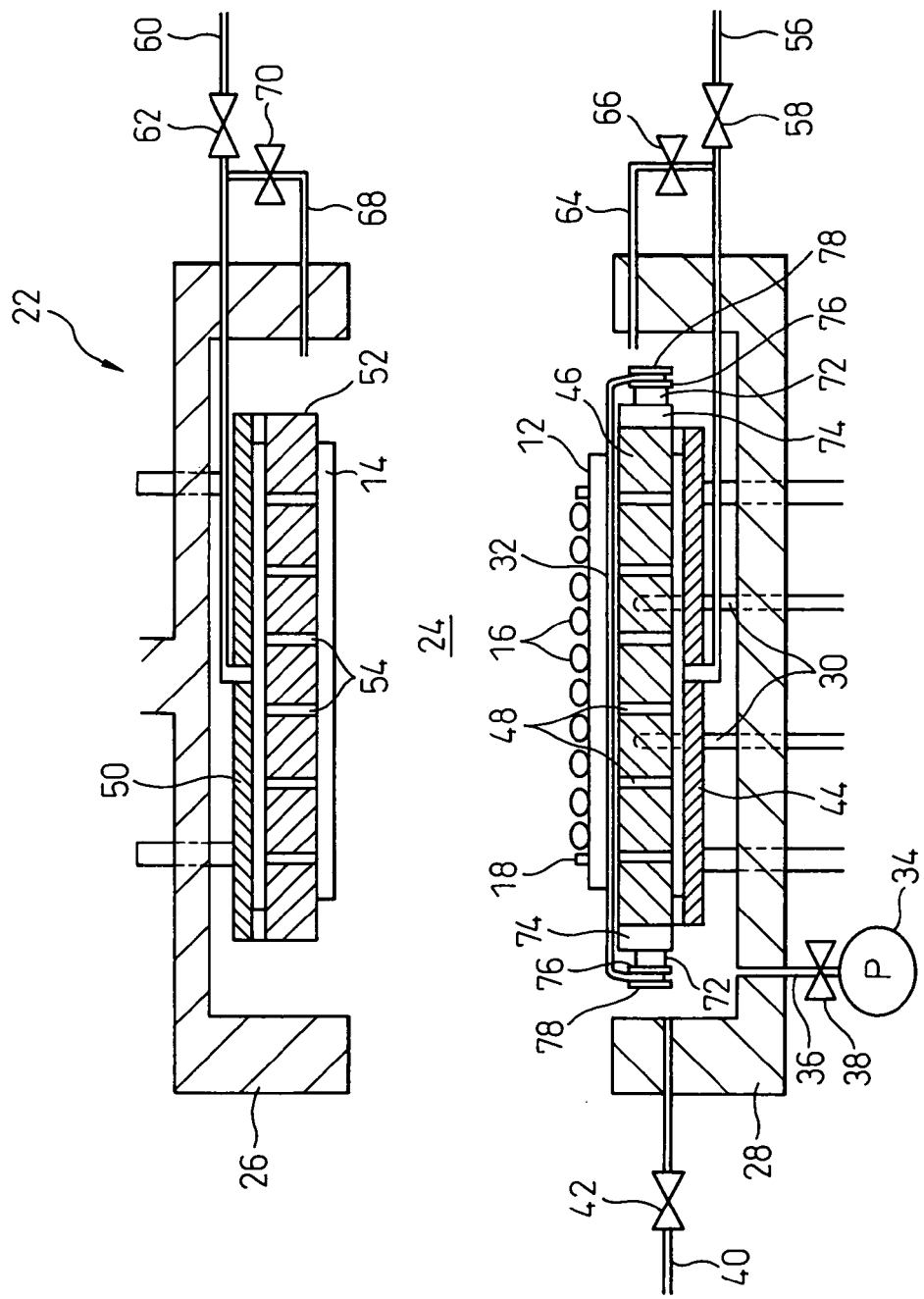
FIG. 3 is a sectional view illustrating a production apparatus to which the method of producing the liquid crystal display device of the present invention is applied.

FIG. 3 is a sectional view illustrating a production apparatus to which the method of producing the liquid crystal display device of the present invention is applied. In FIG. 3, the apparatus 22 for producing the liquid crystal display device includes a vacuum chamber 24. The vacuum chamber 24 comprises a movable upper housing 26 and a stationary lower housing 28. FIG. 3 illustrates a state where the vacuum chamber 24 is opened. When the upper housing 26, in a state shown in FIG. 3, is lowered down toward the lower housing 28, the vacuum chamber 24 is closed.

The vacuum chamber 24 has a vacuum passage 36 connected to a vacuum pump 34 for introducing a vacuum and a purge passage 40 for introducing atmospheric pressure. A valve 38 is disposed in the vacuum passage 36 and a valve 42 is disposed in the purge passage 40. The purge passage 40 introduces an inert gas such as nitrogen into the vacuum chamber 24.

A lower surface plate 44 is provided in the lower housing 28 and is coupled to an XYθ-drive stage that is not shown. A lower electrostatic chuck 46 is supported by the lower surface plate 44. The lower electrostatic chuck 46 has a known electrode that is not shown, and attracts and holds the first substrate 12 arranged on the lower electrostatic chuck 46 by an electrostatic force generated by supplying a current to the electrode. Liquid crystal 16 was dripped on the first substrate 12. The lower electrostatic chuck 46 further has vacuum attraction passage 48. The vacuum attraction passage 48 opens at the surface of the lower electrostatic chuck 46 and works to temporarily attract and hold the first substrate 12 arranged on the lower electrostatic chuck 46 due to a vacuum force supplied from a source of vacuum.

Lift pins 30 are arranged to move up and down in vertical holes formed in the lower surface plate 44 and in the lower electrostatic chuck 46.

A porous resin sheet 32 is arranged on the surface of the lower electrostatic chuck 46. The resin sheet 32 is larger than the lower electrostatic chuck 46, and is not adhered or stuck to the surface of the lower electrostatic chuck 46. Namely, the central portion of the resin sheet 32 is simply placed on the lower electrostatic chuck 46. The end portions of the resin sheet 32 are folded nearly at right angles and are fixed to the side surfaces of the electrostatic chuck 46. In the embodiment, permanent magnets 72 are used for securing the resin sheet 32 to the side surfaces of the lower electrostatic chuck 46. Metal plates 74 are fixed to the side surfaces of the lower electrostatic chuck 46 by bolts, and permanent magnets 72 are attached to the metal plates 74 by their magnetic force. The end portions of the resin sheet 32 are sandwiched and held by two metal plates 76 and 78 that are fixed together by screws. The two metal plates 76 and 78 are held by the permanent magnets 72 by their magnetic force. For example, the metal plates 74, 76 and 78 are made of SUS (SUS400) which is a kind of iron and is a magnetic material. Therefore, the resin sheet 32 can be easily held by the lower electrostatic chuck 46 under tension and can be easily removed from the lower electrostatic chuck 46.

The upper surface plate 50 is movably provided in the upper housing 26, and is coupled to a lift drive device that is not shown. An upper electrostatic chuck 52 is supported by the upper surface plate 50. The upper electrostatic chuck 52 has a known electrode that is not shown, and secures the second substrate 14 arranged under the upper electrostatic chuck 52 by the electrostatic force generated by supplying a voltage to the electrode. The upper electrostatic chuck 52 also has a vacuum attraction passage 54. The vacuum attraction passage 54 opens at the surface of the upper electrostatic chuck 52 and works to temporarily attract and hold the second substrate 14 by a vacuum force supplied from a source of vacuum.

A vacuum attraction line 56 is connected to the vacuum attraction passages 48 in the lower electrostatic chuck 46 of the lower surface plate 44 to supply vacuum to the vacuum attraction passage 48. The vacuum attraction line 56 has a valve 58. The vacuum attraction line 56 extends through the interior of the vacuum chamber 24. A vacuum attraction line 60 is connected to the vacuum adsorption passages 54 in the upper electrostatic chuck 52 of the upper surface plate 50 to supply vacuum to the vacuum attraction passages 54. The vacuum attraction line 60 has a valve 62. The vacuum attraction line 60 extends through the interior of the vacuum chamber 24.

Also, a pressure-equalizing line 64 is connected to the vacuum attraction line 56 downstream of the valve 58 of the vacuum attraction line 56 and is further connected to the interior of the vacuum chamber 24. The pressure-equalizing line 64 has a valve 66. A pressure-equalizing line 68 is connected to the vacuum attraction line 60 downstream of the valve 62 of the vacuum attraction line 60 and is further connected to the interior of the vacuum chamber 24. The pressure-equalizing line 68 has a valve 70.

In FIG. 3, the movable upper housing 26 is separated away from the lower housing 28, and the vacuum chamber 24 is open. In this state, the first and second substrates 12 and 14 are transported into the vacuum chamber 24. The first substrate 12 is placed on the resin sheet 32 on the lower electrostatic chuck 46, and the second substrate 14 is disposed under the upper electrostatic chuck 52.

The valves 58 and 62 of the vacuum attraction lines 56 and 60 are both opened, and the valves 66 and 70 of the pressure-equalizing lines 64 and 68 are closed. Therefore, the first and second substrates 12 and 14 are attracted by the upper and lower electrostatic chucks 46 and 52 due to vacuum attraction force acting on the vacuum attracting passages 48 and 54. Then, an electric voltage is supplied to the electrodes of the upper and lower electrostatic chucks 46 and 52, and the first and second substrates 12 and 14 are attracted by the upper and lower electrostatic chucks 46 and 52 due to the electrostatic attracting force. Thus, the first and second substrates 12 and 14 are temporarily attracted by the upper and lower electrostatic chucks 46 and 52 due to vacuum attraction; so that the first and second substrates 12 and 14 intimately contact the surfaces of the upper and lower electrostatic chucks 46 and 52 and, in this state, the electrostatic attracting force is activated to obtain a stable electrostatic attracting force with less dispersion in the attraction force. The first substrate 12 is attracted by the lower electrostatic chuck 46 via the resin sheet 32.

Then, the movable upper housing 26 is urged onto the lower housing 28 to close the vacuum chamber 24. The valves 58 and 62 of the vacuum attraction lines 56 and 60 are then both closed, and the valves 66 and 70 of the pressure-equalizing lines 64 and 68 are opened. Therefore, the pressure in the vacuum chamber 24 does not escape to the outside through the vacuum attraction lines 56 and 60, and the pressures in the vacuum attraction passages 48 and 54 of the upper and lower electrostatic chucks 46 and 52 become the same as the pressure in the vacuum chamber 24. Therefore, though the pressure drops in the vacuum attraction passages 48 and 54 of the upper and lower electrostatic chucks 46 and 52, the first and second substrates 12 and 14 are reliably held by the upper and lower electrostatic chucks 46 and 52 by the electrostatic attraction force.

Here, the valve 38 of the vacuum passage 36 is opened and the interior of the vacuum chamber 24 is evacuated. For example, the interior of the vacuum chamber 24 is evacuated up to about 1 Pa. This vacuum acts upon the surfaces of the first and second substrates 12 and 14, as well as upon the back surfaces of the first and second substrates 12 and 14 through the pressure-equalizing lines 64 and 68 and through the vacuum attraction passages 48 and 54 of the upper and lower electrostatic chucks 46 and 52. The first and second substrates 12 and 14 are held by the upper and lower electrostatic chucks 46 and 52 by the electrostatic attraction force.

Then, the upper surface plate 50 moves toward the lower surface plate 44. The second substrate 14 is urged toward the first substrate 12. The surface of the second substrate 14 comes into contact with the annular seal 18 of the first substrate 12, and the spacers of the second substrate 14 come in contact with the surface of the first substrate 12. A rough bonding is first effected and a precision bonding is then effected by further pressing the first and second substrates 12 and 14 to each other by lowering the upper surface plate 50 toward the lower surface plate 44 while finely adjusting the position of the lower surface plate 44.

As the annular seal 18 is pressed and the cell gap between the first substrate 12 and the second substrate 14 becomes an appropriate value, the movement of the upper surface plate 50 toward the lower surface plate 44 is stopped. In this way, the first substrate 12 and the second substrate 14 are bonded together in a vacuum, and during this time, the liquid crystal 16 in the form of liquid droplets spreads along the surface of the second substrate 14 without permitting the air to enter the liquid crystal 16.

After the first substrate 12 and the second substrate 14 are bonded together, the valve 42 of the purge passage 40 is opened while the first substrate and the second substrate 14 are kept pressed to each other. An inert gas such as nitrogen is introduced into the vacuum chamber 24 through the purge passage 40, and the vacuum chamber 24 is opened to the atmosphere. At this moment, the valve 70 of the pressure-equalizing line 68 is opened, and the valve 66 of the pressure-equalizing line 64 is closed. Further, the supply of electric current to the upper electrostatic chuck 52 is stopped.

The upper surface plate 50 is now moved away from the lower surface plate 44, and the upper electrostatic chuck 52 is readily separated from the second substrate 14. The valve 66 of the pressure-equalizing line 64 remains closed while the upper surface plate 50 is ascending, so a vacuum acts on the lower side of the first substrate 12 whereby the first substrate 12 (i.e., bonded first and second substrates 12 and 14) is held by the lower electrostatic chuck 46 of the lower surface plate 44.

After the movement of the upper surface plate 50 is finished, the valve 66 of the pressure-equalizing line 64 is opened so that the vacuum attraction passage 48 acquires the atmospheric pressure and is then closed. The lift pins 30 are raised to push up the first substrate 12 (bonded first and second substrates 12 and 14) while purging the vacuum attraction passage 48 by introducing nitrogen through the attraction line 56 and opening the valve 58), so that the bonded first and second substrates 12 and 14 are peeled off from the lower electrostatic chuck 46. In this instance, the resin sheet 32 exists, the first substrate 12 (bonded first and second substrates 12 and 14) is reliably peeled off from lower electrostatic chuck 46 without clinging thereto.

The upper housing 26 moves to separate from the lower housing 28, and the vacuum chamber 24 is opened. Then, the first and second substrates 12 and 14 that are stuck together are taken out from the vacuum chamber 24, carried to another position where the annular seal 18 is irradiated with ultraviolet rays so as to be cured.

Figure 4:
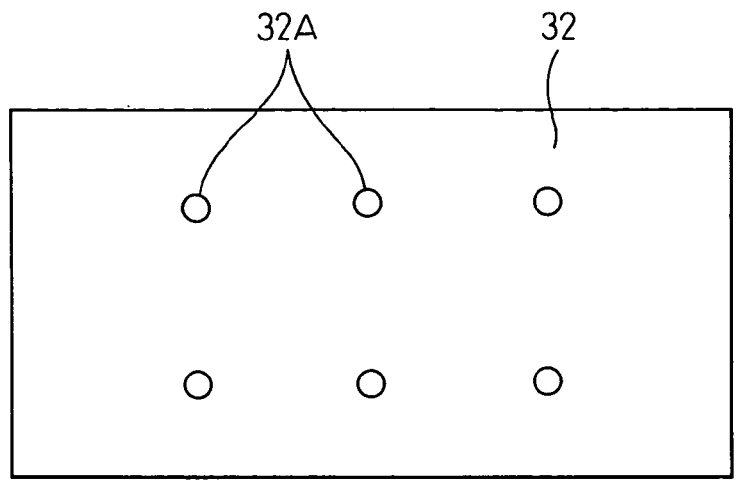
FIG. 4 is a plan view illustrating a resin sheet.

As the resin sheet 32, a porous resin sheet made of an ultra-high molecular polyethylene having a dielectric constant of 2.2. (SUNMAP manufactured by Nitto Denko Co. for example.) is used. The resin sheet 32 is porous, so it can be used irrespective of the arrangement of the vacuum attraction passage 48. As shown in FIG. 4, the resin sheet 32 has holes 32A through which the lift pins 30 for transferring the substrate can be inserted. Therefore, the lift pins 30 pass through the resin sheet 32 to push up the first substrate 12.

It is desirable to vary the voltage applied to the lower electrostatic chuck 46, by taking the use of the resin sheet 32 into consideration. When the resin sheet 32 is not used, a voltage of, for example, 2 KV may be enough to hold the glass substrate, but when the resin sheet 32 is used, there may be a case where attraction force is not obtained even if a voltage of 3 KV is applied. A sufficiently large attraction force is obtained when a voltage of not lower than 3.5 KV is applied to the lower electrostatic chuck 46, and a good bonding can be accomplished. In this embodiment, a voltage of ±4 KV, which is twice as high as an ordinarily employed voltage, is applied to the lower electrostatic chuck 46. A strong attraction force is obtained or a decreased voltage may be applied if the resin sheet 32 is made of a material having a dielectric constant of not smaller than 1.8. Desirably, the resin sheet 32 has a dielectric constant of not smaller than 2.2.

The resin sheet 32 has a thickness of 0.3 mm. A large attraction force is obtained as the thickness of the resin sheet 32 decreases. However, if foreign matter is brought in between the lower electrostatic chuck 46 and the resin sheet 32, a large cushioning effect is obtained as the thickness of the resin sheet 32 increases. It is therefore desired that the thickness of the resin sheet 32 is thick within a range in which a sufficiently large attraction force is obtained. It is desired that the thickness of the resin sheet 32 is in a range of not smaller than 10 μm but not larger than 1 mm.

Figure 5:
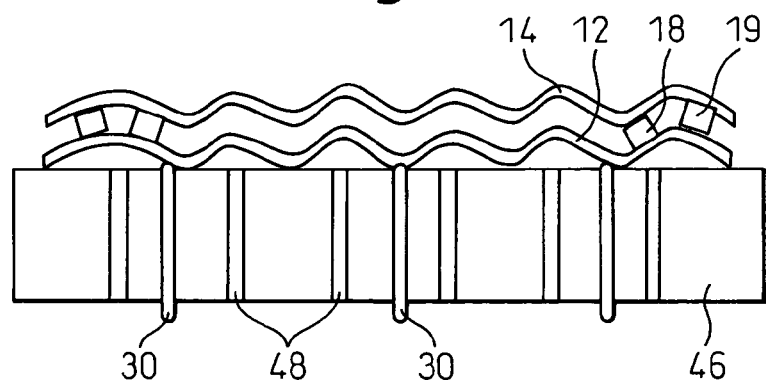
FIG. 5 is a view illustrating, in an exaggerated manner, a state where the first substrate is pushed up by lift pins when there is no resin sheet.
Figure 6:
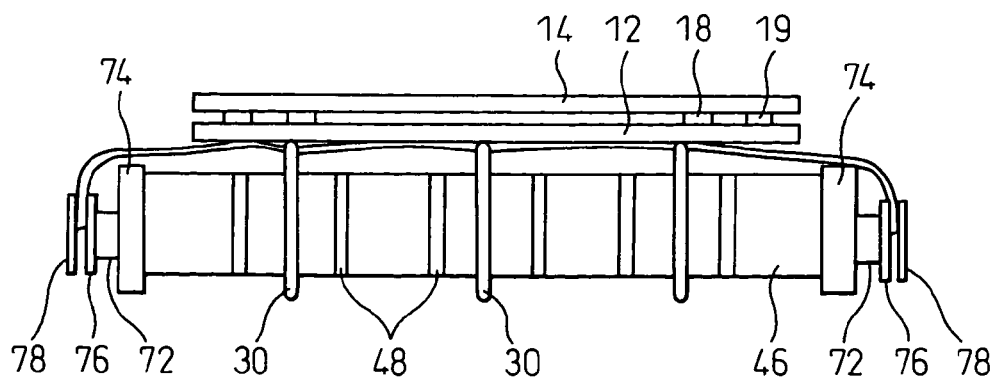
FIG. 6 is a view illustrating, in an exaggerated manner, a state where the first substrate is pushed up by lift pins when there is a resin sheet.

FIG. 5 is a view illustrating, in an exaggerated manner, a state where the first substrate 12 is pushed up by the lift pins 30 when there is no resin sheet 32. FIG. 6 is a view illustrating, in an exaggerated manner, a state where the first substrate 12 is pushed up by the lift pins 30 when there is the resin sheet 32.

In FIG. 5, in the case where there is no resin sheet 32, when the first substrate 12 is peeled off from the lower electrostatic chuck 46, there is a possibility that the first substrate 12 may not be completely peeled off from the lower electrostatic chuck 46 (but may partly but strongly cling thereto) because there is residual charge of the lower electrostatic chuck 46 and nitrogen $N_2$ does not completely spread between the first substrate 12 and the lower electrostatic chuck 46 with small vacuum regions remained. If the lift pins 30 are raised in this state, the portions of the first substrate 12 clinging to the lower electrostatic chuck 46 are forcibly peeled off, and the first substrate 12 is deformed, causing a bonding deviation of the liquid crystal panel comprising the first substrate 12 and the second substrate 14.

In FIG. 6, in the case where there is a resin sheet 32, when the first substrate 12 is peeled off from the lower electrostatic chuck 46, irrespective of whether the resin sheet 32 may partly cling to the first substrate 12, the first substrate 12 and the resin sheet 32 are raised in such a state that they are stuck to each other as the lift pins 30 are raised, and the resin sheet 32 is peeled off from the lower electrostatic chuck 46 as the lift pins 30 are raised, and the first substrate 12 does not cling to the lower electrostatic chuck 46. In a state where the first substrate 12 is raised to some extent, the resin sheet 32 is peeled off from the first substrate 12 without any problem.

Figure 7:
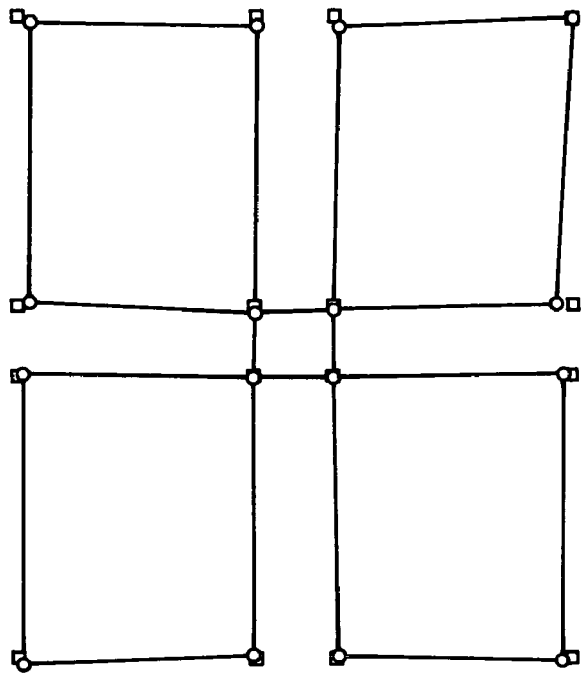
FIG. 7 is a view illustrating a deformation of the first substrate when there is the resin sheet.
Figure 8:
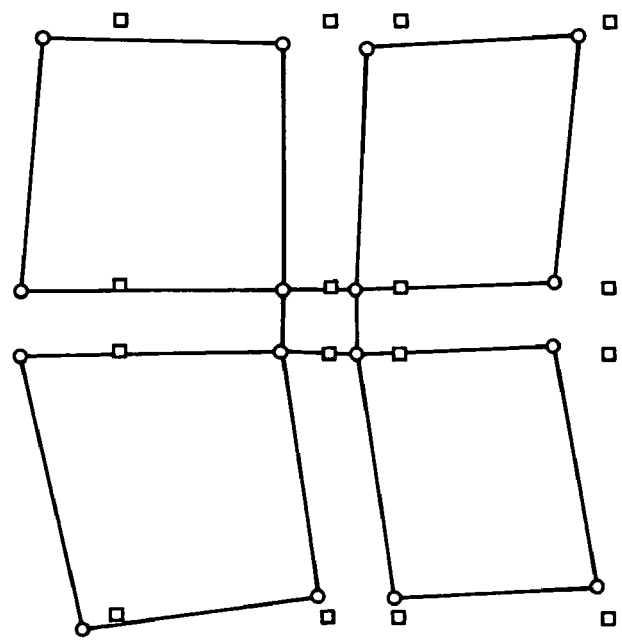
FIG. 8 is a view illustrating a deformation of the first substrate when there is no resin sheet.

FIG. 7 is a view illustrating a deformation of the first substrate 12 when there is the resin sheet 32, and FIG. 8 is a view illustrating a deformation of the first substrate 12 when there is no resin sheet 32. FIGS. 7 and 8 are diagrams illustrating deviation of a large substrate including substrates of four panels. In FIGS. 7 and 8, square points represent design values and round points represent measured values. The amount of deformation of the substrate shown in FIG. 7 is smaller than the amount of deformation of the substrate shown in FIG. 8. Also, when there is a resin sheet 32, defects in the gap caused by foreign matter are reduced by the cushioning property of the resin sheet 32; i.e., there is observed no defective gap due to foreign matter. The thus produced liquid crystal panel is stable in regard to deviation that develops through the production steps, is hardly affected by foreign matter that may happen to be introduced, and a percent of a defective cell gap is small.

A substrate measuring 400 mm×500 mm and substrates measuring 680 mm×880 mm are prepared to determine the effect. When there is no resin sheet 32, the amount of deformation increases with an increase in the size of the substrates. When there is the resin sheet 32, the amount of deformation decreased despite an increase in the size of the substrates. However, the amount of the residual charge and the spreading rate of nitrogen differ depending upon the substrates, and not all of the substrates involve problems. When the pressure and flow rate of nitrogen are increased so as to decrease the amount of deformation of the substrates, the substrate that is apt to be peeled off hovers on the electrostatic chuck, whereby the substrate position is deviated, and the substrate, after being lifted up by pins, cannot be properly transferred, and good conditions are not obtained.

FIG. 9 illustrates another embodiment of the present invention. The embodiment of FIG. 9 is the same as the embodiment of FIG. 3 except that another resin sheet 32 is arranged on the surface of the upper electrostatic chuck 52 in addition to the resin sheet 32 that is arranged on the surface of the lower electrostatic chuck 46. The first and second substrates are held by the upper and lower electrostatic chucks 46 and 52 through the respective resin sheets 32, and the bonding can be effected. In FIG. 9, further, there are illustrated an XYθ drive stage 80 and a lift drive device 82.

As described above, according to the present invention, it is possible to solve the problems of deviation that occur when the substrates are peeled off after the substrates are opened to the atmosphere and a defective cell gap that occurs when foreign matter is introduced into the electrostatic chucks. Thus, the present invention suppresses a drop in yield in mass production. Therefore, the present invention makes it possible to obtain a large liquid crystal display device based on the drip injection method with a good yield.

The invention claimed is:

1. A method of producing a liquid crystal display device having a first substrate, a second substrate, a liquid crystal inserted between the first substrate and the second substrate, and a seal provided between the first substrate and the second substrate so as to surround the liquid crystal, said method comprising:

dripping a liquid crystal in a region in an annular seal formed on a first substrate;

preparing a second substrate;

arranging a resin sheet on a surface of at least one of a first electrostatic chuck and a second electrostatic chuck arranged in a vacuum chamber;

holding one of the first substrate and the second substrate by said at least one electrostatic chuck via the resin sheet;

holding the other substrate by the other electrostatic chuck;

evacuating the vacuum chamber;

bonding the first substrate and the second substrate together in the vacuum chamber; and opening the vacuum chamber to the atmosphere, wherein a central portion of the resin sheet is placed on said at least one electrostatic chuck so as to be capable of being lifted from said at least one electrostatic chuck, and end portions of the resin sheet are fixed to said at least one electrostatic chuck, wherein the first substrate and the second substrate bonded together and the resin sheet are simultaneously lifted up from said at least one electrostatic chuck by a lift pin while the end portions of the resin sheet remain fixed to side surfaces of the electrostatic chuck, and wherein the resin sheet has a hole through which the lift pin can be inserted.

2. A method of producing a liquid crystal display device according to claim 1, wherein the electrostatic chucks have vacuum attraction passages.

3. A method of producing a liquid crystal display device according to claim 1, wherein the resin sheet is fixed to said at least one electrostatic chuck by a magnet.

4. A method of producing a liquid crystal display device according to claim 1, wherein a resin sheet is arranged on the surface of the first electrostatic chuck and another resin sheet is arranged on the surface of the second electrostatic chuck.

5. A method of producing a liquid crystal display device according to claim 1, wherein a central portion of the resin sheet is placed on said at least one electrostatic chuck so as to be liftable from said at least one electrostatic chuck, and an end portion of the resin sheet is fixed to side surfaces of said at least one electrostatic chuck.

6. A method of producing a liquid crystal display device according to claim 1, wherein the resin sheet comprises a porous resin sheet.

7. A method of producing a liquid crystal display device according to claim 6, wherein the resin sheet has a thickness in a range of not smaller than 10 µm but not larger than 1 mm.

8. A method of producing a liquid crystal display device according to claim 6, wherein the resin sheet has a dielectric constant of not smaller than 1.8.

9. A method of producing a liquid crystal display device according to claim 1, further comprising the step of bending one or more portions of said resin sheet relative to said surface of said respective first or second electrostatic chucks after said arranging a resin sheet step and before said holding one of the first substrate and the second substrate step.

10. A method of producing a liquid crystal display device according to claim 9, wherein a central portion of the resin sheet is placed on said at least one electrostatic chuck so as to be liftable from said at least one electrostatic chuck, and an end portion of the resin sheet is fixed to side surfaces of said at least one electrostatic chuck.

11. A method of producing a liquid crystal display device having a first substrate, a second substrate, a liquid crystal inserted between the first substrate and the second substrate, and a seal provided between the first substrate and the second substrate so as to surround the liquid crystal, said method comprising:

dripping a liquid crystal in a region in an annular seal formed on a first substrate;

preparing a second substrate;

arranging a resin sheet on a surface of at least one of a first electrostatic chuck and a second electrostatic chuck arranged in a vacuum chamber;

bending one or more portions of said resin sheet relative to said surface of said respective first or second electrostatic chucks;

holding one of the first substrate and the second substrate by said at least one electrostatic chuck via the resin sheet;

holding the other substrate by the other electrostatic chuck;

evacuating the vacuum chamber;

bonding the first substrate and the second substrate together in the vacuum chamber; and opening the vacuum chamber to the atmosphere, wherein a central portion of the resin sheet is placed on said at least one electrostatic chuck so as to be capable of being lifted from said at least one electrostatic chuck, and end portions of the resin sheet are fixed to side surfaces of said at least one electrostatic chuck, wherein the first substrate and the second substrate bonded together and the resin sheet are simultaneously lifted up from said at least one electrostatic chuck by a lift pin while the end portions of the resin sheet remain fixed to side surfaces of the electrostatic chuck.

12. A method of producing a liquid crystal display device according to claim 11, wherein the resin sheet has a hole through which the lift pin can be inserted.

13. A method of producing a liquid crystal display device according to claim 11, wherein the resin sheet is fixed to said at least one electrostatic chuck by a magnet.

* * * * *

UNITED STATES PATENT AND TRADEMARK OFFICE
CERTIFICATE OF CORRECTION

PATENT NO. : 7,407,559 B2  
APPLICATION NO. : 10/800124  
DATED : August 5, 2008  
INVENTOR(S) : Murata et al.

Page 1 of 1

It is certified that error appears in the above-identified patent and that said Letters Patent is hereby corrected as shown below:

On the Title Page of the Patent:

In Col. 1, please include the following Foreign Application Priority Data:

(30)    Foreign Application Priority Data

March 14, 2003    (JP) ………………………….. 2003-070401

Signed and Sealed this

Twenty-first Day of October, 2008

JON W. DUDAS  
*Director of the United States Patent and Trademark Office*